United States Patent
Sarkar et al.

(10) Patent No.: US 9,258,756 B2
(45) Date of Patent: Feb. 9, 2016

(54) SYSTEM AND METHOD FOR MITIGATING CONGESTION HANDLING DURING HS CELL CHANGE

(71) Applicant: Telefonaktiebolaget L M Ericsson (publ), Stockholm (SE)

(72) Inventors: Debasish Sarkar, Irvine, CA (US); Ayan Sen, Gurgaon (IN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 78 days.

(21) Appl. No.: 14/246,577

(22) Filed: Apr. 7, 2014

(65) Prior Publication Data

US 2015/0289184 A1 Oct. 8, 2015

(51) Int. Cl.
*H04W 36/18* (2009.01)
*H04W 36/30* (2009.01)
*H04W 36/38* (2009.01)

(52) U.S. Cl.
CPC .............. *H04W 36/18* (2013.01); *H04W 36/30* (2013.01); *H04W 36/38* (2013.01)

(58) Field of Classification Search
CPC .................................................. H04W 36/18
USPC .............................. 455/442, 453, 450, 452.1
See application file for complete search history.

(56) References Cited

U.S. PATENT DOCUMENTS

| | | | | |
|---|---|---|---|---|
| 7,710,922 B2* | 5/2010 | Lundh et al. | | 370/331 |
| 7,760,683 B2* | 7/2010 | Ishii et al. | | 455/453 |
| 8,254,321 B2* | 8/2012 | Pani et al. | | 370/329 |
| 8,488,464 B2* | 7/2013 | Lundh et al. | | 370/235 |
| 8,619,718 B2* | 12/2013 | Miller | | 370/335 |
| 2009/0196254 A1 | 8/2009 | Cha et al. | | |
| 2011/0044292 A1 | 2/2011 | Eravelli et al. | | |

FOREIGN PATENT DOCUMENTS

EP  2 205 021  7/2010

OTHER PUBLICATIONS

"Notification of Transmittal of the International Search Report and the Written Opinion of the International Searching Authority, or the Declaration" International application No. PCT/IB2015/052445 13 pages, Jul. 20, 2015 Received Sep. 10, 2015.
Samsung: "Correction to HS-DSCH reception conditions" 3GPP Draft: R2-041568 HSDSCH Reception REL-5, 3rd Generation Partnership Project Route Des Lucioles; Cedex France, vol. RAN WG2, no. Prague, Czech Republic 20040810, XP050126271 25 pages, Aug. 10, 2004.

* cited by examiner

*Primary Examiner* — Michael T Vu
(74) *Attorney, Agent, or Firm* — Baker Botts, LLP (57) ABSTRACT

According to some embodiments, a radio network controller (RNC) facilitates a communication session for a wireless device in soft handover with an active set of cells. The active set of cells includes a serving cell (which provides an HS-DSCH connection) and a plurality of non-serving cells. The RNC attempts to admit the HS-DSCH connection in a first non-serving cell that satisfies each of one or more HS-DSCH cell change requirements and provides the best signal strength to the wireless device. If a failure occurs, the RNC attempts to admit the HS-DSCH connection in a second non-serving cell that satisfies each of the HS-DSCH cell change requirements and provides the second best signal strength to the wireless device. If successful, the RNC facilitates moving the HS-DSCH connection from the serving cell to the second non-serving cell.

18 Claims, 8 Drawing Sheets

| CID (In current ASET) | Ec/No (dB) |
| --- | --- |
| Cell B | -14 |
| Cell C | -18 |
| Cell A *(Current Serving HS-DSCH Cell)* | -10 |

Figure 3A

| CID (In current ASET) | Ec/No (dB) |
| --- | --- |
| Cell B | -14 |
| Cell C | -18 |
| Cell A *(Current Serving HS-DSCH Cell)* | -22 |

SYSTEM AND METHOD FOR MITIGATING CONGESTION HANDLING DURING HS CELL CHANGE

TECHNICAL FIELD

Particular embodiments relate generally to wireless communications and more particularly to a system and method for mitigating congestion handling during HS cell change.

BACKGROUND

In a wireless network, a wireless device may communicate with one or more radio access nodes to send and/or receive information, such as voice traffic, data traffic, control signals, and so on. In some cases, the wireless device may have a connection with a particular radio access node, but have additional radio access nodes that the wireless device could connect to. In certain circumstances, the wireless device may not be able to maintain its connection to the particular radio access node. In such circumstances, it may be desirable for the wireless device to connect to one of the additional radio access nodes to avoid releasing the connection.

SUMMARY

According to some embodiments, a radio network controller facilitates a communication session for a wireless device in soft handover with a current active set of cells. The active set of cells includes a serving cell and a plurality of non-serving cells. The serving cell provides the wireless device with a high speed downlink shared channel (HS-DSCH) connection. The radio network controller receives a power and quality measurement report indicating signal strengths that the wireless device receives from the active set of cells.

According to some embodiments, the radio network controller determines, based on the power and quality measurement report, that the wireless device receives a best signal strength from a first target cell. The first target cell may be selected from the plurality of non-serving cells within the current active set of cells. The radio network controller determines that the first target cell satisfies each of one or more HS-DSCH cell change requirements, and selects the first target cell to provide the HS-DSCH connection. The radio network controller determines that call admission fails for the first target cell. The radio network controller determines, based on the power and quality measurement report, that the wireless device receives a second-best signal strength from a second target cell. The second target cell may be selected from the plurality of non-serving cells within the current active set of cells.

According to some embodiments, the radio network controller determines that the second target cell satisfies each of the one or more HS-DSCH cell change requirements, and selects, in response to determining that the call admission fails for the first target cell, the second target cell to provide the HS-DSCH connection. The radio network controller facilitates moving the HS-DSCH connection from the serving cell to the second target cell if the second target cell succeeds at the call admission.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

A radio network controller may facilitate a communication session for a wireless device in soft handover with an active set of cells. The active set may include a serving cell and one or more non-serving cells. In certain circumstances, the serving cell may provide the wireless device with a high-speed downlink shared channel (HS-DSCH). A change of the serving HS-DSCH cell may be triggered by removal of the serving cell from the active set. When the serving HS-DSCH cell change is triggered, a call might be released if the non-serving cells do not have sufficient resources, either HS-DSCH or dedicated channel (DCH), to accommodate the call. In some instances, release of a call is undesirable because it reflects low retainability and may frustrate a customer.

As noted above, an HS-DSCH cell change may be triggered by removal or replacement of the current serving cell. In existing systems, a radio network controller will respond to removal or replacement of the current serving cell in a particular manner. Assuming both serving and non-serving cells are HS-DSCH capable, the radio network controller will initially select the non-serving cell having the best signal strength as a target cell from among the non-serving active set cells that support HS-DSCH. Certain existing implementations may require that the signal strength of the target cell be better than the signal strength of the serving cell according to a predetermined amount. For example, the predetermined amount may correspond to half a hysteresis factor. If the above criterion (and depending on some other associated criteria, such as HS-DSCH cell change being allowed) is fulfilled, the radio network controller will start the HS-DSCH cell change execution.

If the cell change execution cannot be done or fails, and the connection does not drop, then the radio network controller will attempt to reconfigure to dedicated channel (DCH). If transition to DCH is allowed, (for example in the case where hsToDchTrigger::servHsChangeIntraRnc=TRUE (and assuming target cell belongs to the same RNC)), reconfiguration to DCH will be attempted. Reconfiguration to DCH may involve an attempt to down-switch to DCH (a connection not using HS-DSCH). If the transition to DCH is blocked by Admission Control, is not allowed, or fails, then the connection may be released.

There are deficiencies in the existing implementation. For example, if HS-DSCH cell change fails due to an Admission Control Response from the target cell and transition to DCH is not enabled or fails, the connection may be released.

Certain embodiments of the present disclosure may address these and potentially other deficiencies of the existing systems. In certain circumstances, the active set may have three or more cells (i.e., the current serving cell and two or more non-serving cells). In certain embodiments, all of the cells in the active set may be associated with the same radio network controller. In certain other embodiments, the serving cell may be associated with a first radio network controller and one or more of the non-serving cells may be associated with a second radio network controller. Where the Active Set has three or more cells (for example, where maxActiveSet=3 or more), the problem of call release in response to call admission failure can be mitigated. Initially, the radio network controller may select a first target cell from the two or more non-serving cells (i.e., the best of the remaining active set cells that support HS-DSCH).

In certain embodiments, the radio network controller may determine that the first target cell meets certain HS-DSCH cell change requirements. For example, in certain embodiments it may be required that the first target cell be an intra-RNC or inter-RNC HS-DSCH capable and enabled cell. As another example, in certain embodiments it may be required that the first target cell have a signal strength that exceeds the serving cell signal strength by a predetermined amount. In certain embodiments, the predetermined amount may correspond to half a hysteresis factor. In certain embodiments, if the target cell is a DRNC Cell over Iur, then hsdschSupport must be enabled for the Iur link cellCapabilityControl parameter. In certain embodiments, if these conditions are fulfilled, a suitable first target cell is found and HS-DSCH cell change from the serving cell to the first target cell may be attempted.

As described above, HS-DSCH cell change triggered by removal of the serving HS-DSCH cell from the Active Set may result in call release due to call admission failure at the target HS-DSCH enabled and capable cell. As an example, and not by way of limitation, call admission failure resulting in call release may occur due to Admission Control reject by the first target cell. Instead of declaring an HS-DSCH cell change failure when call admission fails for the first target cell (i.e., the strongest non-serving cell in the Active Set), it is proposed that a second non-serving cell be evaluated for probable HS-DSCH cell change procedure.

The radio network controller may evaluate a second non-serving cell as a potential second target cell to determine if certain criteria are found to be fulfilled by the second target cell. In certain embodiments, the criteria for the second target cell may be the same as those described above regarding the first target cell. If the above described criteria are met, a suitable second target cell is found and HS-DSCH cell change from the serving cell to the second target cell may be attempted. If admission control at the second target cell passes, then HS-DSCH cell change may be performed. If admission control at the second target cell is not passed, then the radio network controller may determine whether transition to DCH is allowed. If transition to DCH is allowed, reconfiguration to DCH will be attempted. Reconfiguration to DCH may involve an attempt to down-switch from HS-DSCH connection to DCH in the current serving cell. If the transition to DCH is blocked by Admission Control, is not allowed, or fails, then the connection may be released.

Thus, rather than releasing a call in response to HS-DSCH cell change failure at the first target cell, embodiments of the present disclosure attempt to perform HS-DSCH cell change to a second target cell. In certain embodiments, where there are more than two non-serving cells meeting the HS-DSCH cell change requirements, the radio network controller may evaluate these additional non-serving cells as potential target cells. By attempting to perform HS-DSCH cell change at the second target cell in addition to the first target cell, the probability that a call is retained may be improved, and fewer calls may be released in response to call admission failure at the first target cell. Additionally, in certain embodiments, such an approach may advantageously maintain higher throughput by providing additional opportunities to maintain an HS-DSCH connection. In certain embodiments, call retainability may be further improved by down-switching to DCH in the event that HS-DSCH cell change fails at both the first and second target cells.

Particular embodiments are described in FIGS. 1-7 of the drawings, like numerals being used for like and corresponding parts of the various drawings.

Figure 1:
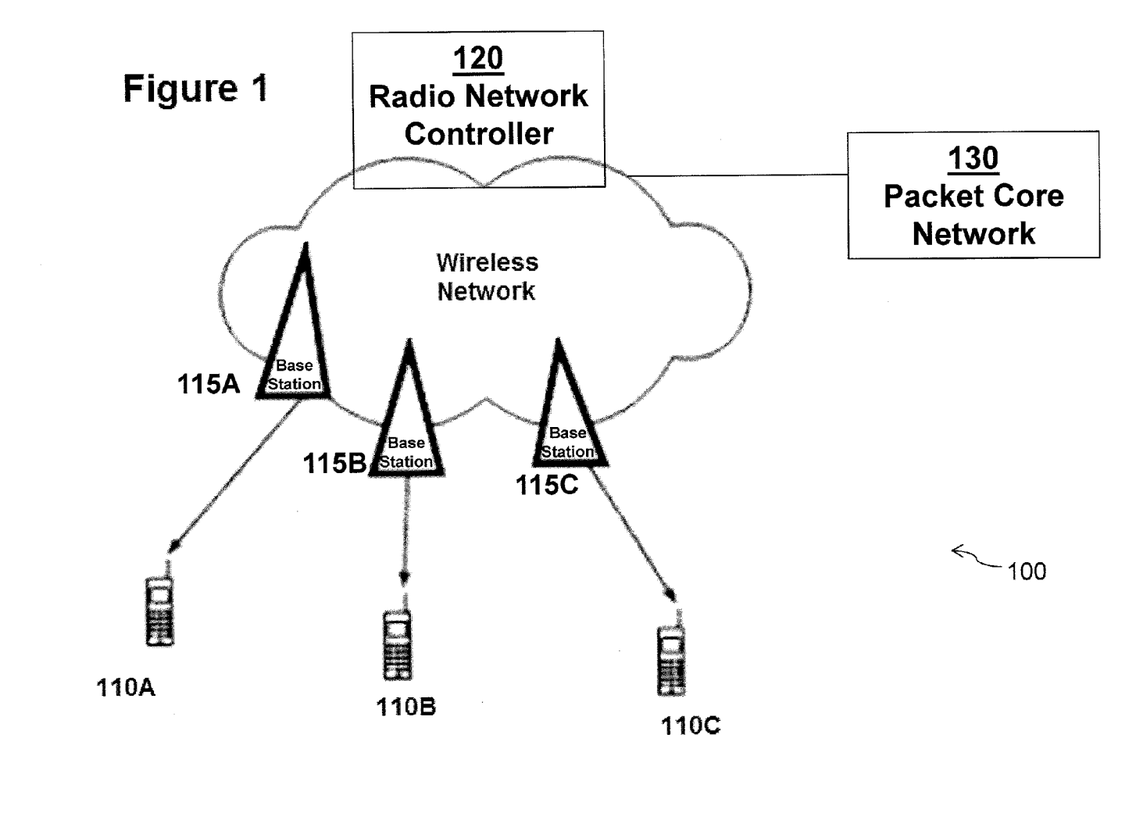
FIG. 1 is a block diagram illustrating an embodiment of a network.

FIG. 1 is a block diagram illustrating embodiments of a network 100 that includes one or more wireless devices 110, radio network nodes 115, radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, radio network node 115, and a network node (such as radio network controller 120 or core network node 130) are described with respect to FIGS. 5, 6, and 7, respectively.

Figure 2:
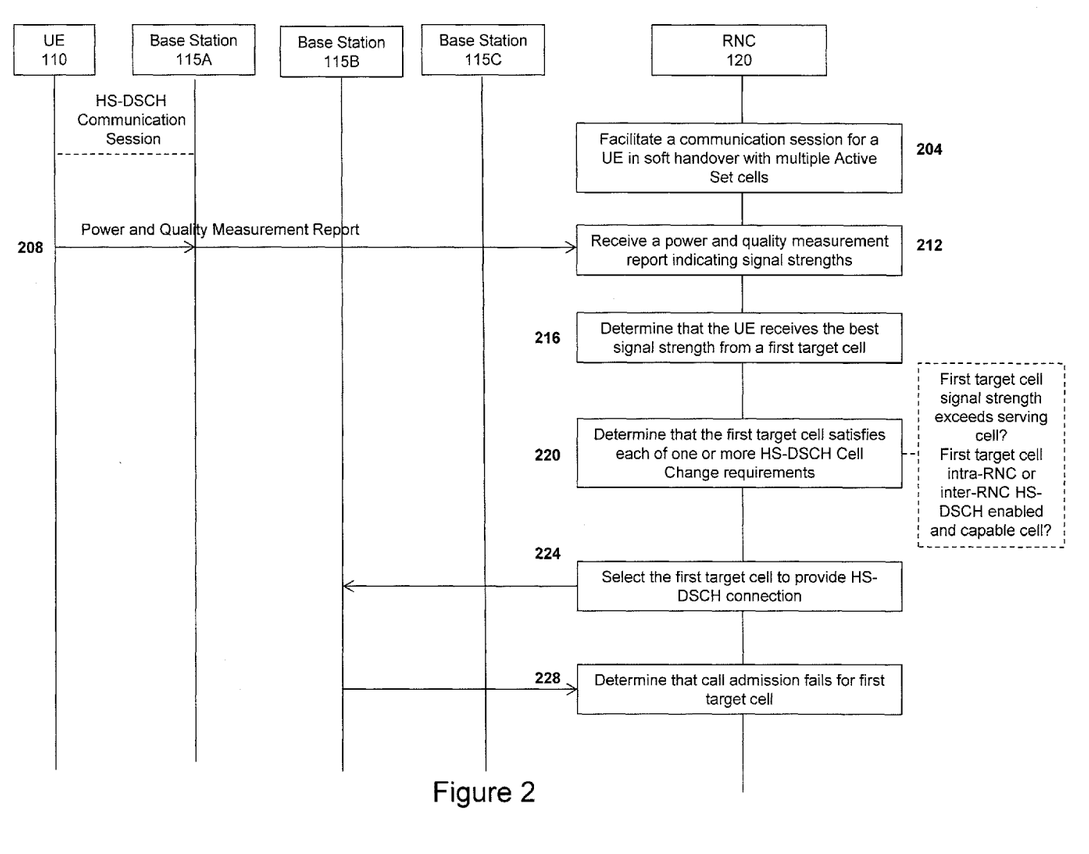
FIG. 2 is a signaling diagram illustrating an exchange of signals in certain embodiments of a network.

FIG. 2 is a signaling diagram illustrating an exchange of signals in certain embodiments of a network. In certain embodiments, network 100 may be a 2G, 3G, or WCDMA mobile network, or any other suitable mobile network or other network. In some embodiments, the signals may be exchanged among a wireless device 110 (such as UE 110), a radio network node 115 (such as base stations 115A-C), and a radio network controller 120.

At step 204, radio network controller 120 may facilitate an HS-DSCH communication session for user equipment 110 in soft handover with multiple active set cells. In certain embodiments, user equipment 110 may have an active set of cells. The active set of cells may contain three or more cells. For example, the active set may include a serving HS-DSCH cell (such as base station 115A), and a plurality of non-serving HS-DSCH cells (such as base stations 115B and 115C). Although FIG. 2 illustrates two non-serving cells in the active set, the present disclosure contemplates any suitable number of non-serving cells in the active set. In certain embodiments, the serving and non-serving cells may be associated with the same radio network controller. In certain other embodiments, the serving cell may be associated with a first radio network controller and one or more of the non-serving cells may be associated with a second radio network controller.

The serving cell may be the cell currently providing an HS-DSCH connection to user equipment 110. In the example illustrated in FIG. 2, base station 115A is the current serving cell because it is currently providing an HS-DSCH connection to user equipment 110. In certain embodiments, the current serving cell (such as base station 115A) may provide the strongest signal strength to user equipment 110. It certain embodiments, however, the signal strength of base station 115A may deteriorate to a point where it no longer has the strongest signal strength, or it may become unavailable (e.g., removed from user equipment 110's active set of cells) or replaced.

At step 208, user equipment 110 may generate a power and quality measurement report. In certain embodiments, the power and quality measurement report may indicate the signal strengths of the serving and non-serving cells in user equipment 110's active set. As an example, the power and quality measurement report may indicate the Ec/No (dB) number of each cell in the active set. At step 212, radio network controller 120 may receive the power and quality measurement report indicating signal strengths of cells in the active set from user equipment 110. In certain embodiments, the power and quality measurement report may indicate that the current serving cell 115A no longer provides the strongest signal to user equipment 110. At step 216, radio network controller 120 may determine that user equipment 110 receives the best signal strength from a first target cell. In certain embodiments, the first target cell may be selected from the one or more non-serving HS-DSCH cells within user equipment 110's current active set of cells. As illustrated in FIG. 2, the first target cell may be base station 115B.

Having determined that the first target cell 115B provides the strongest signal, at step 220 radio network controller 120 may determine that the first target cell 115B satisfies each of one or more HS-DSCH cell change requirements. In certain embodiments, the one or more HS-DSCH cell change requirements may require that the signal strength of the first target cell 115B exceed the signal strength of the current serving cell 115A by a predetermined amount. In certain embodiments, the predetermined amount may correspond to half of a hysteresis factor. In certain embodiments, the hysteresis factor may be adjustable. In certain embodiments, the one or more HS-DSCH cell change requirements may require that the first target cell 115B be an intra-RNC or inter-RNC HS-DSCH enabled and capable cell. The present disclosure contemplates that the HS-DSCH cell change requirements may include any suitable requirements in addition to or in place of those discussed above.

As an example, the active set may have current serving cell 115A and two non-serving cells 115B and 115C. The power and quality measurement report may indicate that current serving cell 115A may have an Ec/No (dB) of −22. The power and quality measurement report may indicate that non-serving cells 115B and 115C may have Ec/No (dB) of −14 and −18, respectively. In certain embodiments, the hysteresis factor may be set to 5 dB. Thus, in this example radio network controller 120 would select non-serving cell 115B as be the first target cell because it has the best signal strength in the active set (as compared to serving cell 115A and non-serving cell 115C), and it meets the requirement that its signal strength exceed that of serving cell 115A by half the hysteresis factor (one-half of 5 is 2.5). In the present example, therefore, non-serving cell 115B may be selected as the first target cell.

At step 224, radio network controller 120 may select the first target cell 115B to provide an HS-DSCH connection to user equipment 110. At step 228, radio network controller 120 may determine that call admission fails for the first target cell 115B. In certain embodiments, call admission may fail for a variety of reasons. As an example, and not by way of limitation, call admission may fail because the maximum number of HS-DSCH user licenses available to first target cell 115B has been met, and the first target cell 115B cannot accept the HS-DSCH connection to user equipment 110.

At step 232, radio network controller 120 determines that user equipment 110 receives a second-best signal strength from a second target cell 115C. In certain embodiments, the second target cell may be selected from among the one or more non-serving cells in the active set. At step 236, radio network controller 120 may determine that the second target cell 115C satisfies each of one or more HS-DSCH cell change requirements. In certain embodiments, the one or more HS-DSCH cell change requirements may require that the signal strength of the second target cell 115C exceed the signal strength of the current serving cell 115A by a predetermined amount. In certain embodiments, the predetermined amount may correspond to half of a hysteresis factor. In certain embodiments, the hysteresis factor may be adjustable. In certain embodiments, the one or more HS-DSCH cell change requirements may require that the second target cell 115C be an intra-RNC or inter-RNC HS-DSCH enabled and capable cell. The present disclosure contemplates that the HS-DSCH cell change requirements may include any suitable requirements in addition to or in place of those discussed above.

As an example, the active set may have a current serving cell 115A and two non-serving cells 115B and 115C. As noted above, call admission may have failed at the first target cell 115B. As noted above, the power and quality measurement report may indicate that current serving cell 115A may have an Ec/No (dB) of −22. The power and quality measurement report may indicate that the non-serving cells 115B and 115C have Ec/No (dB) of −14 and −18, respectively. In certain embodiments, the hysteresis factor may be set to 5 dB. In certain embodiments, non-serving cell 115C may have the second-best signal strength in the active set (as compared to serving cell 115A and non-serving cell 115B), and non-serving cell 115C may meet the requirement that its signal strength exceed that of serving cell 115A by half the hysteresis factor (one-half of 5 equals 2.5). Thus, in the present example, non-serving cell 115C may be selected as the second target cell.

At step 240, radio network controller 120 may select the second target cell 115C to provide HS-DSCH connection to user equipment 110. At step 244, radio network controller 120 may facilitate moving the HS-DSCH connection from the serving cell 115A to the second target cell 115C if the second target cell succeeds at the call admission. At step 248, an HS-DSCH communication session may be established between user equipment 110 and the second target cell 115C. In certain embodiments, such an approach is desirable because it both maintains the high throughput of an HS-DSCH connection and improves the probability that a call will be retained.

In certain embodiments, call admission at the second target cell may fail. Call admission may fail for any number of reasons. For example, the second target cell 115C may not have a license to add another call. If call admission at the second target cell fails, radio network controller 120 may skip steps 244 and 248, and proceed to step 252 to down-switch from the HS-DSCH connection to DCH in the current serving cell 115A. Although the solution may be less desirable than establishing an HS-DSCH connection with the first or second target cell, in certain embodiments such a solution may still advantageously improve call retention, preventing call release by down-switching to DCH.

Figure 3A:
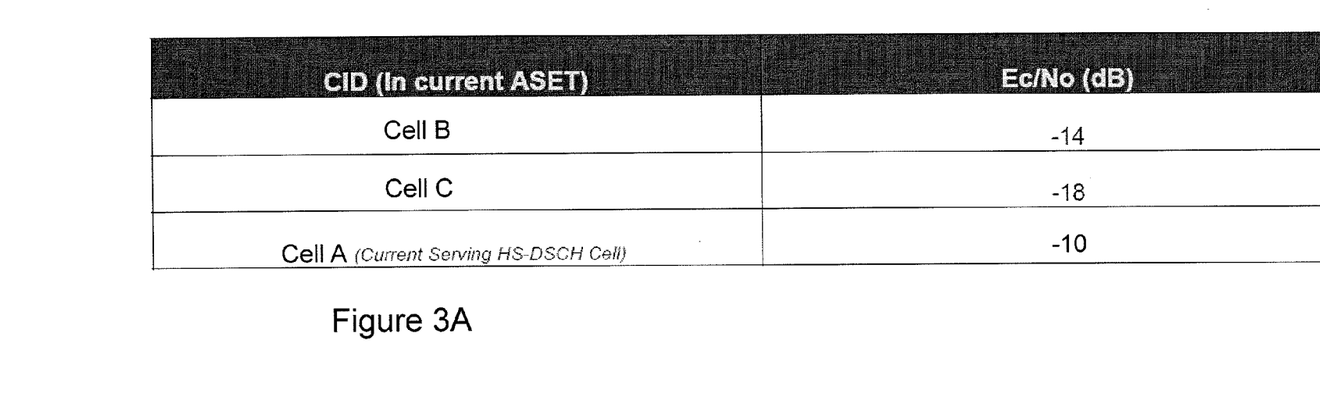
FIGS. 3A and 3B are tables illustrating the signal strength of cells in an active set in accordance with certain embodiments.
Figure 3B:
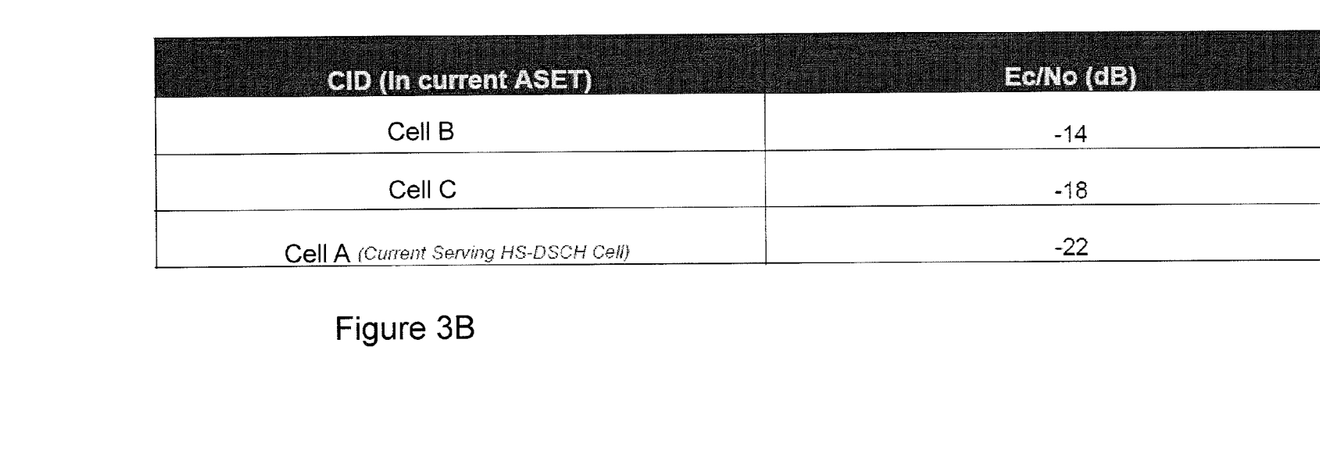

FIGS. 3A and 3B are tables illustrating the signal strength of cells in an active set in accordance with certain embodiments. FIG. 3A illustrates the signal strength of cells in an active set at a first point in time. As described above, the active set may contain a serving cell and one or more non-serving cells. In certain embodiments, the serving cell may have the strongest signal strength of the cells in the active set. The serving and non-serving cells may be HS-DSCH enabled and capable cells. Although FIGS. 3A and 3B illustrate three cells in the active set, the present disclosure contemplates that there can be any suitable number of cells in the active set.

As illustrated in FIG. 3A, Cell A is the current serving cell and has the strongest signal strength (−10 Ec/No (dB)). Other cells in the active set may include non-serving Cell B and non-serving Cell C, which may have signal strengths weaker than those of serving Cell A. In certain embodiments, serving Cell A may provide an HS-DSCH connection to user equipment 110. Non-serving Cell B and non-serving Cell C may meet one or more HS-DSCH cell change requirements. As an example, non-serving Cell B and non-serving Cell C may be intra-radio network controller or inter-radio network controller HS-DSCH enabled and capable cells. However, non-serving Cell B and non-serving Cell C may not meet other HS-DSCH cell change requirements, such as signal strength exceeding that of serving cell 115A by a predetermined amount. Thus, a power and quality measurement report associated with FIG. 3A might not trigger an HS-DSCH change.

In certain embodiments, serving Cell A may be removed or replaced in the active set, or may no longer have the strongest signal among the cells in the active set. As an example, FIG. 3B illustrates the signal strength of cells in the active set at a second point in time. As illustrated in FIG. 3B, the signal strength of serving Cell A may decrease, for example from −10 Ec/No (dB) to −22 Ec/No (db). In such a scenario, radio network controller 120 may attempt to establish an HS-DSCH connection with one of the other cells in the active set. Radio network controller 120 may determine, based on a power and quality measurement report from user equipment 110, that non-serving Cell B provides the best signal strength. In response to this determination, radio network controller 120 may select non-serving Cell B as a first target cell. Radio network controller 120 may determine that first target Cell B satisfies each of one or more HS-DSCH cell change requirements including, for example, those described above with respect to FIG. 2.

In some embodiments, one of the HS-DSCH cell change requirements may require the signal strength of first target Cell B to exceed the signal strength of serving Cell A by a predetermined amount. Radio network controller 120 may determine that the signal strength of first target Cell B exceeds the signal strength of serving Cell A by a pre-determined amount. In certain embodiments, the predetermined amount may correspond to half of a hysteresis factor, and the hysteresis factor may be adjustable. In the illustrated example, the hysteresis factor may be 5 dB. Because first target Cell B has a signal strength that exceeds the signal strength of current serving Cell A by more than half of the hysteresis factor (−14 is greater than −19.5 (−22+2.5)), radio network controller 120 may determine that first target Cell B meets this HS-DSCH cell change requirement. Assuming that any other HS-DSCH cell change requirements are met, radio network controller 120 may attempt to establish an HS-DSCH connection between user equipment 110 and first target Cell B.

As described above, attempts to establish an HS-DSCH connection between user equipment 110 and first target Cell B may be unsuccessful. As an example, call admission may fail because the maximum number of HS-DSCH user licenses available to the first target cell B has been met and the first target cell cannot accept the HS-DSCH connection with user equipment 110. In certain embodiments, such as those where two or more non-serving cells are in the active set, radio network controller 120 may determine, based on the power and quality measurement report from user equipment 110, that non-serving Cell C provides the second-best signal strength, and that non-serving Cell C may be a second target cell. Radio network controller 120 may determine that second target Cell C may satisfy each of one or more HS-DSCH cell change requirements including, for example, those described above with respect to FIG. 2.

In some embodiments, one of the HS-DSCH cell change requirements may require the signal strength of second target Cell C to exceed the signal strength of serving Cell A by a predetermined amount. Radio network controller 120 may determine that the signal strength of second target Cell C exceeds the signal strength of serving Cell A by a pre-determined amount. As noted above, the predetermined amount may correspond to half of a hysteresis factor, and the hysteresis factor may be adjustable. In the illustrated example, the hysteresis factor is 5 dB. Because second target Cell C has a signal strength that exceeds serving Cell A by more than half of the hysteresis factor (−18 is greater than −19.5 (−22+2.5)), radio network controller 120 may determine that second target Cell C meets this HS-DSCH cell change requirement. Assuming that any other requirements are met, radio network controller 120 may attempt to establish an HS-DSCH connection between user equipment 110 and second target Cell C.

In general, embodiments of the present disclosure attempt to increase the probability that a call will be retained after the current serving cell becomes unavailable or unusable for an HS-DSCH connection. A first target cell may be selected from among the non-serving cells in the active set. If HSDPA admission control fails on the first target cell in the active set, radio network controller 120 does not release the call. Instead, radio network controller 120 attempts to establish an HS-DSCH connection with a second target cell having the next strongest signal strength. In certain embodiments, if HSDPA admission control fails for the second target cell, but hsToDchTrigger→servHsChangeIntraRnc is enabled, attempt will be made to allocate DCH in the current Serving Cell. If hsToDchTrigger→servHsChangeIntraRnc is not enabled, the call may be released. In certain embodiments, this advantageously results in an increased likelihood that the call will be retained.

Figure 4:
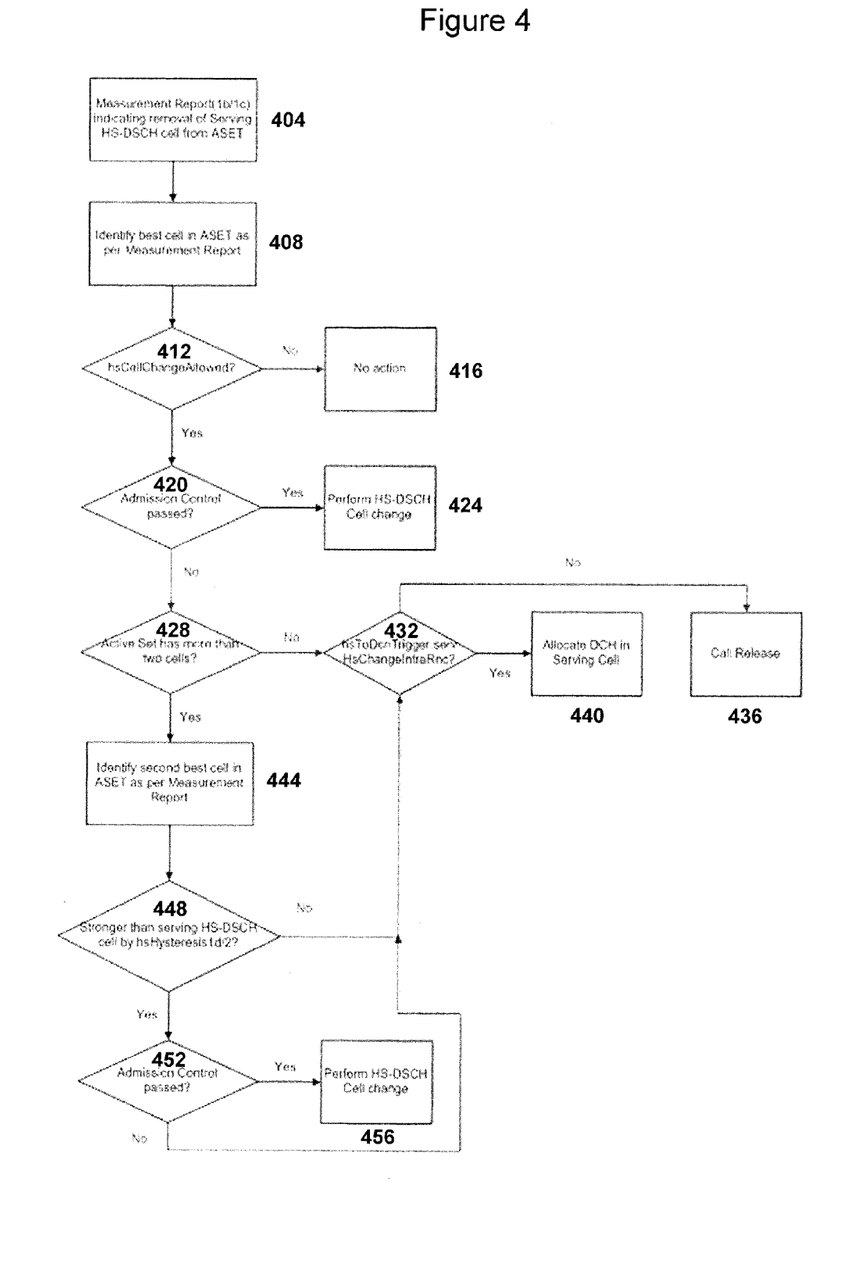
FIG. 4 is a flow chart depicting an algorithm according to certain embodiments.

FIG. 4 is a flow chart depicting an algorithm according to certain embodiments. At step 404, a measurement report indicating removal of Serving HS-DSCH cell from the active set is received. As described above, the measurement report may provide information relating to the signal strengths of the cells in the active set. In certain embodiments, the measurement report may be sent to the radio network by a wireless device via a base station. At step 408, the radio network controller identifies the best cell in the active set based on the measurement report received from user equipment 110. In certain embodiments, the best cell may be selected by identifying the non-serving cell having the strongest signal strength. In certain embodiments, the best cell is selected as a first target cell.

At decision point 412, the radio network controller may determine whether HS-DSCH cell change is allowed. If HS-DSCH cell change is not allowed, then the algorithm proceeds to step 416, and no action is taken. If HS-DSCH cell change is allowed, the algorithm proceeds to decision point 420. At decision point 420, the radio network controller determines whether admission control is passed for the first target cell. If admission control is passed, the algorithm proceeds to step 424 and the radio network controller performs HS-DSCH cell change to the first target cell. If admission control fails, then the algorithm proceeds to decision point 428.

At decision point 428, the algorithm determines whether the active set has more than two cells. If the active set does not have more than two cells, then the algorithm proceeds to step 432. At step 432, the radio network controller attempts to down-switch from the HS-DSCH connection to DCH. If the attempt to down-switch from the HS-DSCH connection to DCH fails, then the algorithm proceeds to step 436 and the call is released. If the attempt to down-switch from the HS-DSCH connection to DCH is successful, the algorithm proceeds to step 440 and the radio network controller allocates DCH in the serving cell.

If at decision point 428 the algorithm determines that the active set does have more than two cells, then the algorithm proceeds to step 444. At step 444, the radio network controller identifies the second best cell in the active set based at least in part on the measurement report received from the wireless device at step 404. In certain embodiments, the second best non-serving cell may be selected as a second target cell. At decision point 448, the radio network controller determines whether the second best cell is stronger than the current serving HS-DSCH cell by hsHysteresis1d/2. If it is determined that the second best cell in the active set is not stronger than the serving HS-DSCH cell by hsHysteresis1d/2, then the algorithm proceeds to step 432. At step 432, the radio network controller attempts to down-switch from the HS-DSCH connection to DCH. If the attempt to down-switch from the HS-DSCH connection to DCH fails, then the algorithm proceeds to step 436 and the call is released. If the attempt to down-switch from the HS-DSCH connection to DCH is successful, the algorithm proceeds to step 440 and the radio network controller allocates DCH in the serving cell.

If at decision point 448 it is determined that the second best cell in the active set is stronger than the serving HS-DSCH cell by hsHysteresis1d/2, then the algorithm proceeds to decision point 452. At decision point 452, the radio network controller determines whether admission control is passed at the second best cell. If admission control is passed, the algorithm proceeds to step 456. At step 456, the radio network controller performs HS-DSCH cell change.

If the radio network controller determines at decision point 452 that admission control fails, then the algorithm proceeds to step 432. At step 432, the radio network controller attempts to down-switch from the HS-DSCH connection to DCH. If the attempt to down-switch from the HS-DSCH connection to DCH fails, then the algorithm proceeds to step 436 and the call is released. If the attempt to down-switch from the HS-DSCH connection to DCH is successful, the algorithm proceeds to step 440 and the radio network controller allocates DCH in the serving cell.

As described with respect to FIG. 1 above, embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone).

Wireless device 110, radio network nodes 115, 120, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as WCDMA. However, the scope of the disclosure is not limited to the examples and other embodiments could use different radio access technologies. Each of wireless device 110, radio network node 115, radio network controller 120, and core network node 130 may include any suitable combination of hardware and/or software. Examples of particular embodiments of wireless device 110, radio network node 115, and network nodes (such as radio network controller 120 or core network node 130) are described with respect to FIGS. 5, 6, and 7 below, respectively.

Figure 5:
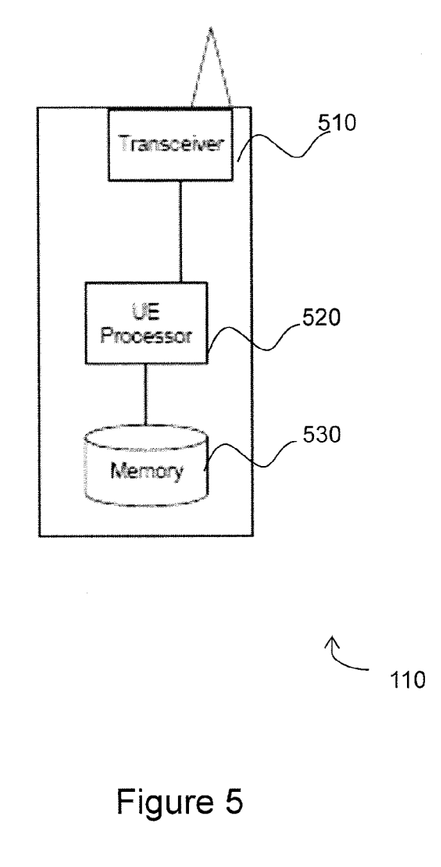
FIG. 5 is a block diagram illustrating certain embodiments of a wireless device.

FIG. 5 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 510, processor 520, and memory 530. In some embodiments, transceiver 510 facilitates transmitting wireless signals to and receiving wireless signals from radio network node 115 (e.g., via an antenna), processor 520 executes instructions to provide some or all of the functionality described above as being provided by wireless device 110, and memory 530 stores the instructions executed by processor 520.

Processor 520 may include any suitable combination of hardware and software implemented in one or more modules to execute instructions and manipulate data to perform some or all of the described functions of wireless device 110. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above).

Figure 6:
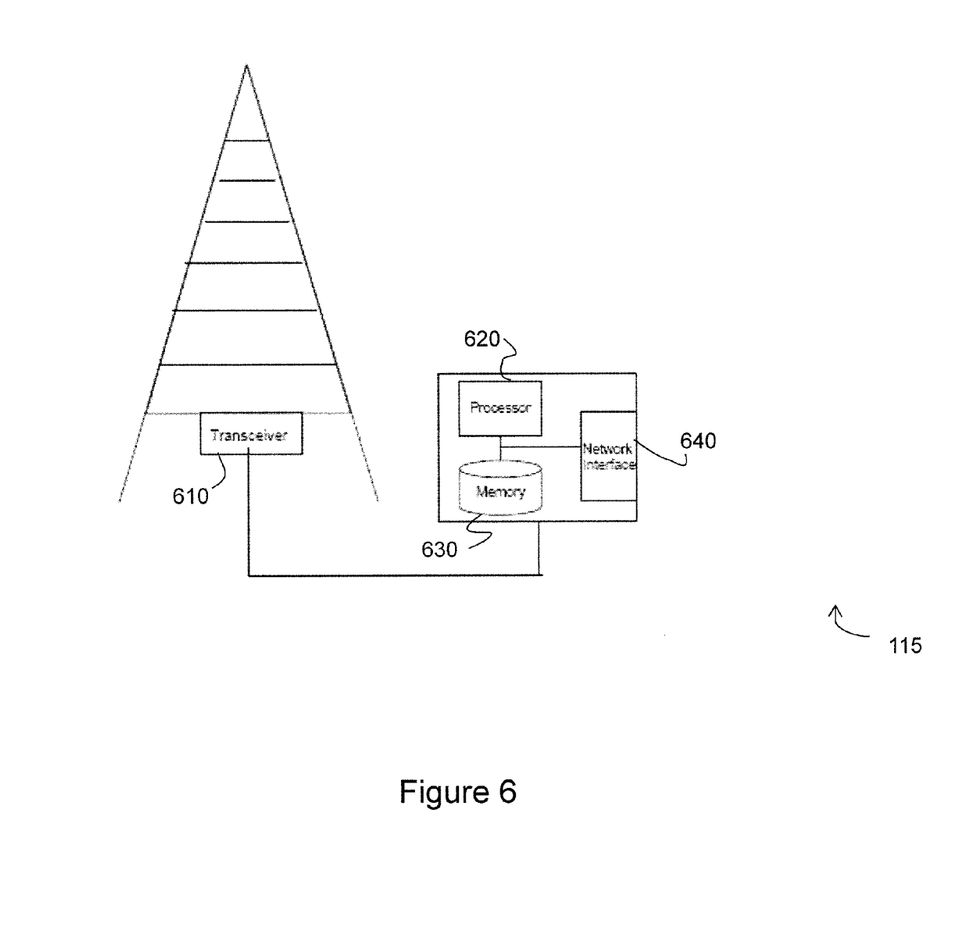
FIG. 6 is a block diagram illustrating certain embodiments of a radio network node.

FIG. 6 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogenous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 610, processor 620, memory 630, and network interface 640. In some embodiments, transceiver 610 facilitates transmitting wireless signals to and receiving wireless signals from wireless device 110 (e.g., via an antenna), processor 620 executes instructions to provide some or all of the functionality described above as being provided by a radio network node 115, memory 630 stores the instructions executed by processor 620, and network interface 640 communicates signals to backend network components, such as a gateway, switch, router, Internet, Public Switched Telephone Network (PSTN), core network nodes 130, radio network controllers 120, etc.

Processor 620 may include any suitable combination of hardware and software implemented in one or more modules to execute instructions and manipulate data to perform some or all of the described functions of radio network node 115. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for radio network node 115, send output from radio network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of radio network node 115 may include additional components beyond those shown in FIG. 6 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 7:
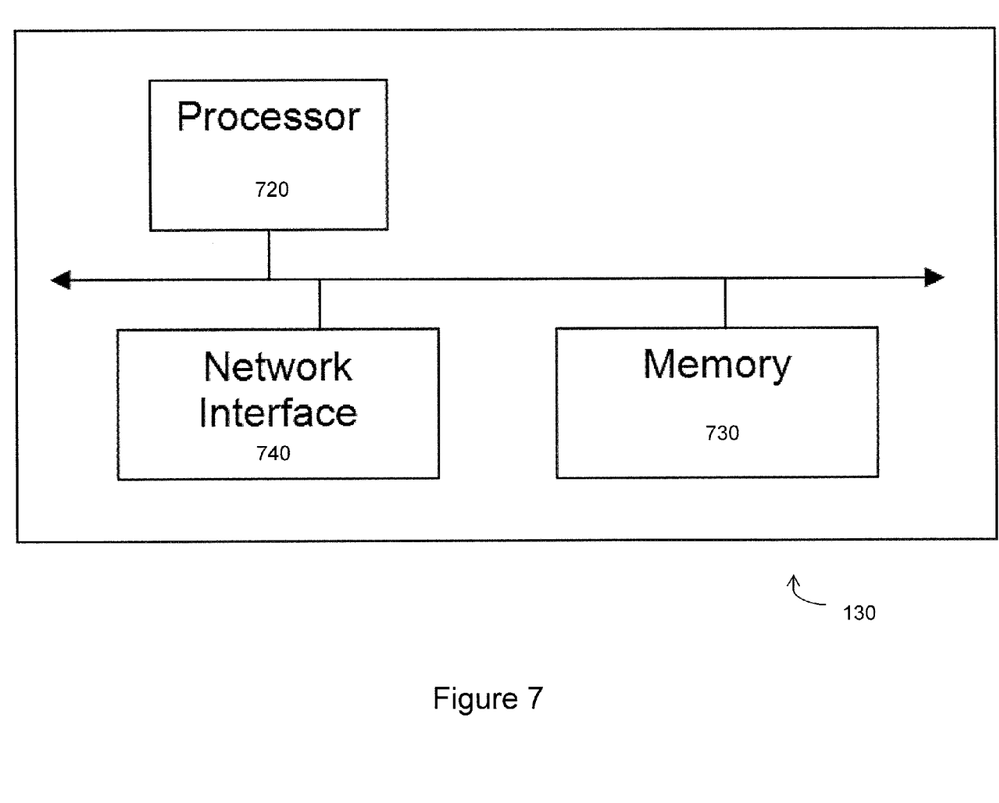
FIG. 7 is a block diagram illustrating certain embodiments of a core network node.

FIG. 7 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 720, memory 730, and network interface 740. In some embodiments, processor 720 executes instructions to provide some or all of the functionality described above as being provided by the network node, memory 730 stores the instructions executed by processor 720, and network interface 740 communicates signals to a suitable node, such as a gateway, switch, router, Internet, Public Switched Telephone Network (PSTN), radio network nodes 115, radio network controllers 120, core network nodes 130, etc.

Processor 720 may include any suitable combination of hardware and software implemented in one or more modules to execute instructions and manipulate data to perform some or all of the described functions of the network node. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, the likelihood of retaining an HS-DSCH call may be advantageously improved by evaluating multiple non-serving cells in the active set in an attempt to perform HS-DSCH cell change. In certain embodiments, the fewer released calls resulting from such an approach may lead to better user perception of the reliability and quality of service provided by an operator. As another advantage, in certain embodiments higher levels of throughput may consistently be achieved by evaluating additional non-serving cells so that HS-DSCH cell change may be performed. In doing so, HS-DSCH connections may be achieved more often instead of resorting to down-switching to DCH in the current serving cell.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
UL: Uplink
DL: Down Link
RRC: Radio Resource Control
NBAP: NodeB Application Protocol
RANAP: Radio Access Network Application Protocol
UE: User Equipment
RNC: Radio Network Controller
DCH: Dedicated Channel
HS-DSCH: High Speed Downlink Shared CHannel
ASET: Active Set
CID: Cell ID

What is claimed:

1. A radio network controller, comprising:
one or more processors; and
a non-transitory computer-readable storage medium further including computer-readable instructions that, when executed by the one or more processors, are configured to:
    facilitate a communication session for a wireless device in soft handover with a current active set of cells, the active set of cells comprising a serving cell and a plurality of non-serving cells, wherein the serving cell provides the wireless device with a high speed downlink shared channel (HS-DSCH) connection;
    receive a power and quality measurement report indicating signal strengths that the wireless device receives from the active set of cells;
    determine, based on the power and quality measurement report, that the wireless device receives a best signal strength from a first target cell, the first target cell selected from the plurality of non-serving cells within the current active set of cells;
    determine that the first target cell satisfies each of one or more HS-DSCH cell change requirements;
    select the first target cell to provide the HS-DSCH connection;
    determine that call admission fails for the first target cell;
    determine, based on the power and quality measurement report, that the wireless device receives a second-best signal strength from a second target cell, the second target cell selected from the plurality of non-serving cells within the current active set of cells;
    determine that the second target cell satisfies each of the one or more HS-DSCH cell change requirements;
    select, in response to determining that the call admission fails for the first target cell, the second target cell to provide the HS-DSCH connection; and
    facilitate moving the HS-DSCH connection from the serving cell to the second target cell if the second target cell succeeds at the call admission.

2. The radio network controller of claim 1, further configured to:
perform, in response to a determination that the call admission fails for the second target cell, a down-switch from the HS-DSCH connection to a dedicated channel (DCH) in the current serving cell.

3. The radio network controller of claim 1, wherein one of the HS-DSCH cell change requirements requires the target cell signal strength to exceed the serving cell signal strength by a pre-determined amount.

4. The radio network controller of claim 3, wherein the pre-determined amount corresponds to half of a hysteresis factor and the hysteresis factor can be adjusted.

5. The radio network controller of claim 1, wherein the serving cell is associated with the radio network controller and at least one of the first target cell and the second target cell is associated with a second radio network controller.

6. The radio network controller of claim 1, wherein one of the HS-DSCH cell change requirements requires the target cell to be an intra-radio network controller HS-DSCH enabled and capable cell or an inter-radio network controller HS-DSCH enabled and capable cell.

7. A method in a radio network controller, comprising:
facilitating a communication session for a wireless device in soft handover with a current active set of cells, the active set of cells comprising a serving cell and a plurality of non-serving cells, wherein the serving cell provides the wireless device with a high speed downlink shared channel (HS-DSCH) connection;
receiving a power and quality measurement report indicating signal strengths that the wireless device receives from the active set of cells;
determining, based on the power and quality measurement report, that the wireless device receives a best signal strength from a first target cell, the first target cell selected from the plurality of non-serving cells within the current active set of cells;
determining that the first target cell satisfies each of one or more HS-DSCH cell change requirements;
selecting the first target cell to provide the HS-DSCH connection;
determining that call admission fails for the first target cell;
determining, based on the power and quality measurement report, that the wireless device receives a second-best signal strength from a second target cell, the second target cell selected from the plurality of non-serving cells within the current active set of cells;

determining that the second target cell satisfies each of the one or more HS-DSCH cell change requirements;

selecting, in response to determining that the call admission fails for the first target cell, the second target cell to provide the HS-DSCH connection; and facilitating moving the HS-DSCH connection from the serving cell to the second target cell if the second target cell succeeds at the call admission.

8. The method of claim 7, further comprising:

performing, in response to a determination that the call admission fails for the second target cell, a down-switch from the HS-DSCH connection to a dedicated channel (DCH) in the current serving cell.

9. The method of claim 7, wherein one of the HS-DSCH cell change requirements requires the target cell signal strength to exceed the serving cell signal strength by a pre-determined amount.

10. The method claim 9, wherein the pre-determined amount corresponds to half of a hysteresis factor and the hysteresis factor can be adjusted.

11. The method of claim 7, wherein the serving cell is associated with the radio network controller and at least one of the first target cell and the second target cell is associated with a second radio network controller.

12. The method of claim 7, wherein one of the HS-DSCH cell change requirements requires the target cell to be an intra-radio network controller HS-DSCH enabled and capable cell or an inter-radio network controller HS-DSCH enabled and capable cell.

13. A non-transitory computer-readable storage medium, having stored thereon a computer program that, when executed on one or more processors, causes the one or more processors to:

facilitate a communication session for a wireless device in soft handover with a current active set of cells, the active set of cells comprising a serving cell and a plurality of non-serving cells, wherein the serving cell provides the wireless device with a high speed downlink shared channel (HS-DSCH) connection;

receive a power and quality measurement report indicating signal strengths that the wireless device receives from the active set of cells;

determine, based on the power and quality measurement report, that the wireless device receives a best signal strength from a first target cell, the first target cell selected from the plurality of non-serving cells within the current active set of cells;

determine that the first target cell satisfies each of one or more HS-DSCH cell change requirements;

select the first target cell to provide the HS-DSCH connection;

determine that call admission fails for the first target cell;

determine, based on the power and quality measurement report, that the wireless device receives a second-best signal strength from a second target cell, the second target cell selected from the plurality of non-serving cells within the current active set of cells;

determine that the second target cell satisfies each of the one or more HS-DSCH cell change requirements;

select, in response to determining that the call admission fails for the first target cell, the second target cell to provide the HS-DSCH connection; and facilitate moving the HS-DSCH connection from the serving cell to the second target cell if the second target cell succeeds at the call admission.

14. The non-transitory computer-readable storage medium of claim 13, further operable to:

perform, in response to a determination that the call admission fails for the second target cell, a down-switch from the HS-DSCH connection to a dedicated channel (DCH) in the current serving cell.

15. The non-transitory computer-readable storage medium of claim 13, wherein one of the HS-DSCH cell change requirements requires the target cell signal strength to exceed the serving cell signal strength by a pre-determined amount.

16. The non-transitory computer-readable storage medium of claim 15, wherein the pre-determined amount corresponds to half of a hysteresis factor and the hysteresis factor can be adjusted.

17. The non-transitory computer-readable storage medium of claim 13, wherein the serving cell is associated with the radio network controller and at least one of the first target cell and the second target cell is associated with a second radio network controller.

18. The non-transitory computer-readable storage medium of claim 13, wherein one of the HS-DSCH cell change requirements requires the target cell to be an intra-radio network controller HS-DSCH enabled and capable cell or an inter-radio network controller HS-DSCH enabled and capable cell.

* * * * *